United States Patent Office 3,734,940
Patented May 22, 1973

3,734,940
CHELATES OF HYDROXY CARBOXYLIC ACIDS AND METHODS FOR PREPARING THE SAME
Andrew M. Rubino, Caldwell, N.J., assignor to Armours Pharmaceutical Company, Berkeley Heights, N.J.
No Drawing. Division of application Ser. No. 544,833, Apr. 25, 1966, now Patent No. 3,553,316, dated Jan. 5, 1971, which is a continuation-in-part of applications Ser. No. 668,886, July 1, 1957, Ser. No. 236,168, Nov. 7, 1962, and Ser. No. 255,218, Jan. 31, 1963, all now abandoned. This application Mar. 30, 1970, Ser. No. 29,716
Int. Cl. C07f 5/06
U.S. Cl. 260—448 B       9 Claims

ABSTRACT OF THE DISCLOSURE

Aluminum chelates are prepared by reacting an aluminum compound selected from the group consisting of alkali metal aluminates and aluminum chlorhydroxy complexes with water and alcohol soluble hydroxy carboxylic acids until no precipitation of aluminum is obtained when a sample of the aqueous reaction solution is heated with an ionic precipitant for aluminum. If necessary, the pH of the reaction solution is adjusted to a range of about 4–9 with an alkali.

---

This is a division of application Sr. No. 544,833, filed Apr. 25, 1966, now U.S. Pat. No. 3,553,316, issued on Jan. 5, 1971, which in turn was a continuation-in-part of each of the following applications:

U.S. patent application Ser. No. 668,886 filed July 1, 1957 by Andrew M. Rubino for Anionic Antiperspirant; now abandoned;

U. S. patent application Ser. No. 236,168 filed Nov. 7, 1962 in the names of Andrew M. Rubino and James J. Martin, Jr. for Alkaline Earth Metal Salts of Aluminum Hydroxy Aliphatic Acid Chelates and Antacid Compositions Containing the Same, now abandoned;

U.S. patent application Ser. No. 255,218 filed Jan. 31, 1963 in the name of Andrew M. Rubino for Aluminum Chelates and Compositions Containing the Same, now abandoned.

This invention relates to chelates of hydroxy carboxylic acids and methods for preparing the same.

The compounds of this invention have particular utility in antacid compositions, in antiperspirant compositions, and as buffers.

Aluminum chlorhydroxy complexes in liquid form have proven very successful as antiperspirants. This invention makes possible and practicable an antiperspirant that may be made into stick form in effective concentration corresponding to as much as 24% or so of the antiperspirant compound, that is soluble in alcohol or methanol, is not subject to precipitation of aluminum by alkali at any pH up to 9 and that may be used, therefore, at such pH as to eliminate any acidic action of the antiperspirant on fabrics or the skin, is not precipitable by soaps in alcoholic solution and so may be used in a soap stick without separation of aluminum soap.

In respect to the aluminum antiperspirant aspects of the present invention, the aluminum is contained in the anionic part of the molecule and is chelated by less than the equivalent proportion, by which is meant less than the maximum number of coordinate positions available on the aluminum atom, and ordinarily about half this proportion of lactic or like chelating carboxylic acid. The process of the invention comprises reacting an aluminum compound with the chelating carboxylic acid and establishing the pH of the finished product, by the addition of sodium hydroxide or like alkali, at a level of about 7.5–9 in case the product is to be used in the soap stick type of antiperspirant or at about 3–9, and preferably 4–9, for use in a liquid solution, as in a spray or other conventional type of antiperspirant.

The chelation only to this extent leaves the aluminum active as an antiperspirant, increases the number of equivalents of aluminum for unit weight of the entire antiperspirant and thus makes possible an effective proportion of aluminum for a stick antiperspirant, and, on the other hand, chelates the aluminum to the extent that the product is miscible with alcohol and the aluminum therein is not precipitable by soap. With such a complex, the alcohol content of the antiperspirant stick of desired consistency may be decreased to a desirably low level, as, for example, as little as 30–40% of the total weight and usually about 35%. Such low proportion of alcohol eliminates or minimizes the irritation caused on certain skins by alcohol of the high concentration otherwise required in stick antiperspirants, decreases the proportion of the whole antiperspirant composition that evaporates quickly after application, and decreases also the dehydrating effect caused by alcohol of high concentration on the skin.

A representative material that illustrates the class of the antiperspirant is the complex involving the radical of the chelating acid (here lactic) and having the various components in proportions about as shown in the empirical formula

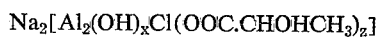

$x$ and $z$ being numbers whose sum is such, as with the Cl, to balance the positive valences of the sodium and aluminum, that is, 8 in this formula. More specifically, $z$ represents the number of equivalent weights of the acid chelate (here moles of lactate.) Thus $z$ is a number within the range 2–4 and $x=7-z$. The sodium or the other alkali metal content is variable, as in the proportion corresponding to 1–1.6 atoms for 1 Al. The part within the bracket is anionic.

Normally, $z$ is a number within the range 2–4 and the chelate can be represented as either the

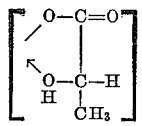

or [OOCCHOCH₃],

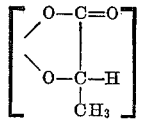

according to the number of equivalent weights of sodium or alkali metal.

An alternative but generally less satisfactory antiperspirant, that cannot be dissolved in a stick to the concentration necessary for best results and that we have made, omits the chlorine. A representative product of this modified type corresponds to the composition of about the proportions shown in the empirical formula

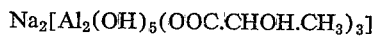

Particularly satisfactory results are obtained when this compound reacted with carboxylic acid is an acidic aluminum hydroxy compound. Thus we use to advantage any one of the aluminum chlorhydroxy complexes at present in use as antiperspirants, as for instance the one of the empirical formula $Al_2(OH_5)Cl$ or any one in which the proportion of Al:Cl in the complex is about 1.5–2.5:1.

As the aluminum compound for our process of making the less satisfactory product containing no chlorine, we may start with a basic aluminum compound. Examples of such basic compounds that we use are sodium, potassium, and ammonium aluminates. These are understood to contain, when dissolved in water, coordinated hydroxy groups.

The carboxylic acid used to react with the selected aluminum compound is metal chelating, non-toxic under the conditions of use, water and alcohol soluble, and suitably of molecular weight that is relatively low. By "alcohol" as used herein is meant to include both monohydroxy alcohols, and polyhydroxy alcohols, such as glycerol, ethylene glycol, propylene glycol, butylene glycol and solutions of hexitols. Lactic acid meets the requirements and illustrates the class to be chosen. Other hydroxycarboxylic acids that may be used less effectively, as in making sticks of lower aluminum content, are citric, tartaric, and mixtures thereof. Still other hydroxycarboxylic acids that are water or alcohol soluble may be used. Examples of these include glycolic, gluconic, trihydroxy glutaric, citryl trigluconic, citryl monogluconic, citryl digluconic, malic, tetrahydroxy adipic, and citramalic acids, and mixtures thereof.

For stick antiperspirants, amino acids are not recommended.

As to proportions in respect to antiperspirant sticks, we use a balance between the total of basic and acidic groups so as to establish the best pH levels for the different forms of the finished antiperspirant. The proportion of the hydroxycarboxylic acid must be adequate to make the aluminum in the antiperspirant non-precipitable when tested by the addition of ammonium hydroxide to establish the pH at 9. We obtain satisfactory results when the proportion of the acid is not more than 2 equivalent weights for each aluminum atom, 1.5 equivalent weights of the acid being particularly satisfactory. With less than 1 equivalent of the acid, the extent of chelation is inadequate. When an alkali metal aluminate is the material treated with the hydroxycarboxylic acid and the proportion of acid used exceeds 1.5 equivalents for 1 atom of aluminum, then an alkali metal (Na, K, Li) hydroxide or carbonate is added to establish the necessary pH of 3–9. When the aluminum chlorohydroxy complex is the starting material, then the alkali is added in all cases. The amount of it required to establish the necessary pH varies with the amount of lactic or other acid used.

As the liquid medium for dispersing or dissolving our anionic aluminum antiperspirant, we use ordinarily water or a water solution of a soluble non-toxic, non-irritating organic liquid. Examples of such organic liquids that we use are the alcohols, ethanol, isopropanol, propanol and propylene glycol. The medium chosen must be one in which the aluminum complex is soluble in proportion to give a commercially acceptable antiperspirant effect, as for example, 2.5–7 parts of aluminum calculated as the oxide for 100 parts of the said medium. This corresponds to about 11%–34% of the complex on the dry basis.

Heating is resorted to, particularly when the aluminum is supplied initially in the form of an aluminum chlorhydroxy complex, to accelerate the chelation. The explanation of the acceleration may involve first a decomplexing action on the said complex in contact with the chelating acid. The chelating acid obtains access to the aluminum and the aluminum undergoes chelation so as to withdraw aluminum ion from the system. For this action, heating at a moderate temperature is used. A temperature of 75° C. is a preferred maximum, for lactic acid, and up to 95° C. for gluconic acid. However, if desired, heating to reflux temperature can be achieved.

The heating is continued, as at 60° C.–75° C., as for 2–5 hours, until tests with ionic precipitants for aluminum (ammonia and soluble soap) show no precipitation even on heating with the ammonia and the soap, such as sodium stearate, for a half hour or so at 70° C. At lower temperatures of chelation, longer time of contact of the acid with the complex are necessary to obtain the non-precipitability.

In a particularly satisfactory method of effecting this so-called decomplexing and chelation, we heat aluminum chlorhydroxy complex of the kind described with water and lactic acid, for instance, at a temperature of 70°–75° C. until the aluminum in the composition is no longer precipitable by ammonia. This requires about 2 hours in a representative run. Then we add an alkali such as sodium hydroxide in amount to establish the pH at about 8–8.5. Then we heat again at 70° C. for at least about 1 hour, i.e. until the resulting material shows no precipitation (no clouding) on being dissolved in an alcoholic solution of sodium stearate or like alkali metal soap and heated at 70° C. for one-half hour.

The chelated composition made with the heating step gives stable compositions when stirred into hot alcohol solutions of soap and remains stable and non-clouding when the resulting solution is cooled, in the next step according to our invention, and is thus set to a gel.

The proportion of soap used in the alcohol solution will vary somewhat with the nature of the soap and the specific alcohol selected, in accordance with known techniques for making gels by dissolving soaps in hot alcohols and cooling to cause setting to gel form. Thus there may be used 10–30 parts of a normally solid, alcohol soluble soap, of which, sodium stearate is an example, for 100 parts of the alcohol calculated to the anhydrous basis. When the alcohol used is ethanol, either denatured or undenatured, a suitable proportion is about 16–24 parts of the soap for 100 to the ethanol.

Satisfactory soaps that illustrate the class to be used are the sodium salts of stearic, palmitic, and lauric acids.

In the compounds of this invention, the aluminum is chelated in the anionic part of the molecule, by association with the hydroxy and carboxylate groups of an alpha- or beta-hydroxy aliphatic carboxylic acid. Ordinarily, for antiperspirant use, from 2 to 4 of the coordination positions of the aluminum atom are taken up by reaction with the acid. For antacid use, all 6 of the coordination positions of the aluminum can be taken up, but the partially complexed chelates are more effective, and are preferred. Free carboxylic acid groups of the chelate are taken up by neutralization with aluminum (as hydroxide or aluminate) or alkali metal, and the resulting salt is water-soluble.

The process of the invention, whereby such complexes are prepared, comprises reacting an aluminum compound with a chelating alpha- or beta-hydroxy aliphatic carboxylic acid, and establishing the pH in the finished product by addition of one of the aforesaid metals or ammonium H in the form of its hydroxide, or a basic salt, or ammonium hydroxide, if necessary, as heretofore indicated to within the range from about 3 to about 9. When the compound is to be used in a soap stick type of antiperspirant the pH is generally adjusted to at least 7 whereas when it is to be used in a liquid solution, either as an antacid or as a liquid antiperspirant in spray form or the like, the pH is adjusted to at least 4. If the starting aluminum compound is a strongly basic compound such as an alkali metal aluminate, sufficient alkali metal is generally present in solution so that it may not be necessary to subsequently add additional quantities of a basic alkali metal compound to the mixture to raise the pH thereof. In some cases, it may even be necessary to add additional acid to lower the pH to the desired level.

In order to prepare the aluminum chelates of the invention, it is important to react the aluminum compound with the hydroxy carboxylic acid under carefully controlled conditions. As the aluminum compound in preparing a chlorine-free product, an alkali metal or ammonium aluminate can be employed, such as sodium or potassium or ammonium aluminates, or reactive aluminum hydroxide such as in the form of the gel, either dry or wet, or aluminum alcoholates, such as aluminum ethylate, aluminum isopropylate, aluminum sec-butoxide, or aluminum tert-butoxide. Chlorine-containing aluminum chelates are obtained by reaction of the acid with an aluminum chlorhydroxy complex corresponding to the formula:

$$Al_2(OH)_xCl_y$$

in which the sum of $x$ and $y$ is 6, and $x$ and $y$ are each at least 1.

EXAMPLE 1

369.5 grams of aluminum hydroxide compressed gel U.S.P. (F-2000, 13.8% $Al_2O_3$) was reacted with 356.4 grams of glucono-delta-lactone at 60–70° C. for 5 hours. At the conclusion of the chelation to form the aluminum hydroxy gluconate 131 grams of 60% $Mg(OH)_2$ paste was then reacted with this solution at 75–80° C. for 2¾ hours. A clear, stable, aqueous solution was obtained, magnesium aluminum hydroxy digluconate, having a pH of 7.3, density 30° Baumé at 28° C., and containing 5.6% $Al_2O_3$, 6.6% MgO, and 47.8% gluconic acid.

A 10 cc. dose of this solution was subjected to the Holbert, Noble and Grote test for antacid effectiveness, with the following results:

| Time, minutes: | pH |
| --- | --- |
| 0 | 1.5 |
| ¼ | 4.65 |
| ½ | 4.90 |
| 1 | 4.95 |
| 2 | 4.95 |
| 3 | 5.0 |
| 4 | 5.0 |
| 5 | 4.95 |
| 6 | 4.95 |
| 7 | 4.95 |
| 8 | 4.95 |
| 9 | 4.95 |
| 10 | 4.95 |
| 20 | 4.85 |
| 30 | 4.65 |
| 40 | 4.40 |
| 50 | 4.20 |
| 60 | 4.0 |
| 70 | 3.85 |
| 80 | 3.68 |
| 90 | 3.50 |
| 100 | 3.35 |
| 120 | 3.05 |
| 140 | 2.70 |

EXAMPLE 2

118 parts of 65% lactic acid solution were added to 155 parts of a 50% aqueous solution of an aluminum chlorhydroxy complex $Al_2(OH)_5Cl$, to which were added also 150 parts of water. This complex solution was then adjusted to a pH of 9.25 with 365 parts of 3/N sodium hydroxide and heated at 75° C. until the aluminum therein was not precipitable by ammonia added to pH 9 or by sodium stearate in alcohol solution. This required 4 hours. The resulting solution, containing about 4.34% of aluminum calculated as the oxide, was then concentrated to approximately 8.5% $Al_2O_3$ by evaporation at 70° C.

The materials, calculated to molar ratios, correspond to $Na_3[Al_2(OH)_2Cl(OOC-CHOH-CH_3)_3]$. It is understood that varying proportions of the sodium and chlorine will exist as $Na^+$ and $Cl^-$ in the solution of the product and that some at least of the lactate radical will appear as

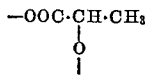

formula

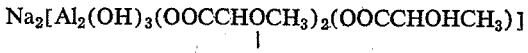

A soap stick antiperspirant containing approximately 5% $Al_2O_3$ was made as follows:

60 parts of the above concentrated solution (8.5% $Al_2O_3$) were stirred into 35 parts of anhydrous denatured (No. 3A) and 7 parts of commercial sodium stearate in solution in the alcohol. 15 drops of perfume oil (jasmine lavender) were added, the whole being at about 60° C. On cooling, a translucent soap stick (5% $Al_2O_3$) in set form resulted.

EXAMPLE 3

An antiperspirant stick was made as follows: A sodium aluminate solution was first prepared by dissolving 11.3 parts of sodium aluminate (45% $Al_2O_3$) in 100 parts of water, the water being understood to introduce coordinated hydroxy groups into the molecule of sodium aluminate. The resulting hydroxy-containing sodium aluminate was then reacted with 100 parts of an aqueous solution of lactic acid containing 13.5 parts of lactic acid. There are thus used 1.5 equivalents, here also 1.5 moles, of the hydroxycarboxylic acid for 1 atom of aluminum in the aluminate.

The lactate solution so made was heated under reflux for about 4 hours and then concentrated by evaporation at a temperature of 70° C., to give a solution containing approximately 6% of aluminum as $Al_2O_3$.

Into 50 parts of the hot concentrated solution so made there were then stirred 64 parts of anhydrous denatured alcohol (No. 3A) in which had been dissolved in advance 7 parts of commercial sodium stearate.

The solution, when cooled to ambient temperature, set to a solid cologne stick containing the anionic antiperspirant distributed substantially uniformly therethroughout.

It is important to limit the concentration of the sodium aluminate solution during the reaction with the lactic acid, not necessarily all hydroxy carboxylic acids. If the proportion of the sodium aluminum is substantially in excess of 2.5 parts of aluminum calculated as the oxide for 100 of the mixed solutions at the time of reaction with the lactic acid, undesired precipitation occurs. For this reason, we keep the concentration at or below 2.5 parts. Thus, we avoid the precipitation. After the reaction is effected, then the resulting solution of the sodium aluminum hydroxy lactate may be and suitably is concentrated to as little an 40% or so of its original solution weight without causing precipitation.

The product so made does not crystallize or separate on standing. The aluminum is chelated or otherwise contained in a complex to the extent that the aluminum is not precipitable by ammonia added in amount to establish a pH as high as 9 or somewhat higher. The antiperspirant solutions made as described above show special advantages over the aluminum hydroxy type previously used in the making of creams, because of the relatively high pH of the solutions as compared to those of the previous type.

In a modification of this example, perfume agent of kind and in amount desired is introduced at some stage before the hot solution is cooled.

Also, a humectant such as propylene glycol, sorbitol, or glycering in usual amount may be incorporated in the hot soap solution of either Example 1 or 2.

The disclosures of U.S. patent applications Ser. Nos. 668,886; 236,168; and 255,218 and 544,833 are incorporated herein by reference.

It is claimed:

1. The anionic product of reacting (a) an aqueous solution of a compound selected from the group consisting of aluminum chlorhydroxy complexes containing approximately 1.5–2.5 atoms of aluminum for each 1 atom of chlorine and alkali metal aluminates with (b) a non-toxic, water and alcohol soluble hydroxycarboxylic acid selected from the group consisting of lactic, citric, tartaric and mixtures thereof in the proportion of 1–2 equivalent weights of (b) for 1 atom of aluminum in (a) and thereafter adding thereto sufficient alkali to provide a pH of 4–9, and maintaining contact between (a) and (b) at said pH to form said anionic product—said product being soluble at a pH of 8–9 in a test solution of sodium stearate in alcohol and the aluminum being non-precipitable therein on heating to 70° C.

2. The anionic product of claim 1 in which the reaction product is of an aluminum chlorhydroxy complex containing 1.5–2.5 atoms of aluminum for one atom of chlorine and the anionic product contains 1–1.6 atoms of sodium for one atom of aluminum.

3. The anionic product of claim 1 in which the acid is lactic acid.

4. The anionic product of claim 1 in which said alkali is selected from the group consisting of alkali metal hydroxides and alkali metal carbonates.

5. A process for preparing an aluminum chelate having a pH in aqueous solution within the range of from about 4 to about 9, which comprises reacting in the presence of water an aluminum compound selected from the group consisting of acidic aluminum chlorhydroxy complexes and alkali metal aluminates with a chelating organic carboxylic acid selected from the group consisting of lactic, tartaric, citric and mixtures thereof in a proportion of 1 to 2 equivalent weights of the acid for each atom of aluminum, at a temperature in which reaction proceeds, until no precipitation of aluminum is obtained when a sample of the solution is heated with an ionic precipitant for aluminum, and then adding, if necessary, an alkali in an amount to adjust the pH of the solution to within the range of from about 4 to about 9.

6. A process in accordance with claim 5 in which chelation is effected at a temperature within the range of from about 60° C. to about 75° C.

7. A process in accordance with claim 5 in which the aluminum compound is an alkali metal aluminate.

8. A process in accordance with claim 5 in which the aluminum compound is an aluminum chlorhydroxide having an Al:Cl mol ratio of about 1.5–2.5 to 1, and the chelate includes chlorine in the molecule.

9. A process in accordance with claim 5 in which the alkali is selected from the group consisting of alkali metal hydroxides and alkali metal carbonates.

References Cited
UNITED STATES PATENTS

| | | | |
|---|---|---|---|
| 3,200,136 | 8/1965 | Grossmith | 260—448 B |
| 3,391,176 | 7/1968 | Grossmith | 260—448 B |

HELEN M. S. SNEED, Primary Examiner

U.S. Cl. X.R.

424—68